(No Model.) 2 Sheets—Sheet 1.

F. HICKMAN.
MACHINE FOR GRINDING PULP STOCK.

No. 529,907. Patented Nov. 27, 1894.

Witnesses

Inventor,
Francis Hickman,
By Alexander Davis,
Attorneys (No Model.) 2 Sheets—Sheet 2.
F. HICKMAN.
MACHINE FOR GRINDING PULP STOCK.
No. 529,907. Patented Nov. 27, 1894.
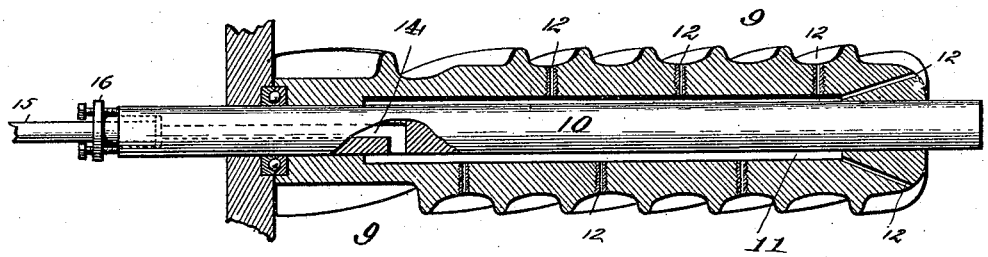
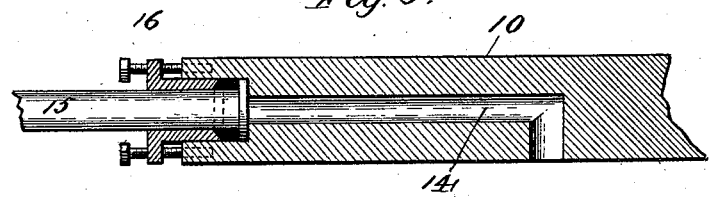
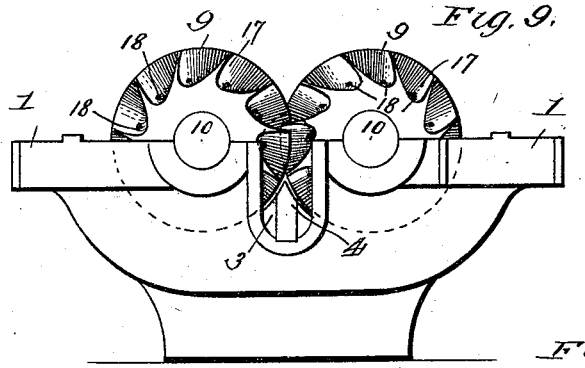 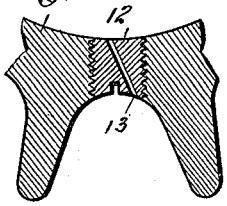
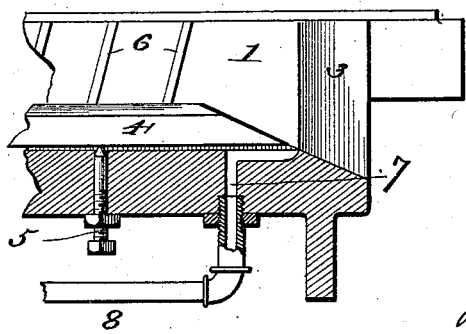
Witnesses
Inventor,
Francis Hickman,
By Alexander Davis,
Attorneys

UNITED STATES PATENT OFFICE.

FRANCIS HICKMAN, OF BOUND BROOK, NEW JERSEY.

MACHINE FOR GRINDING PULP-STOCK.

SPECIFICATION forming part of Letters Patent No. 529,907, dated November 27, 1894.

Application filed January 30, 1894. Serial No. 498,498. (No model.)

*To all whom it may concern:*

Be it known that I, FRANCIS HICKMAN, a citizen of the United States, residing at Bound Brook, in the county of Somerset and State of New Jersey, have invented certain new and useful Improvements in Machines for Grinding Pulp-Stock, of which the following is a specification, reference being had therein to the accompanying drawings, in which—

Figure 1:
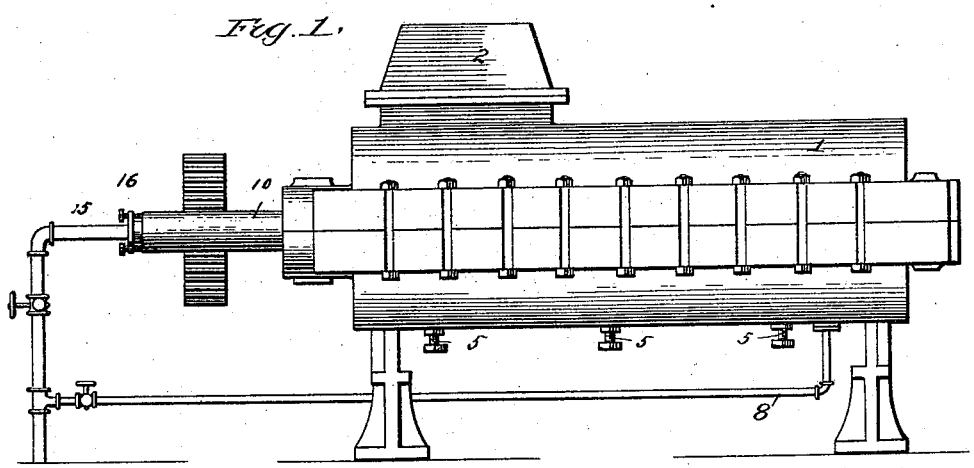
Figure 2:
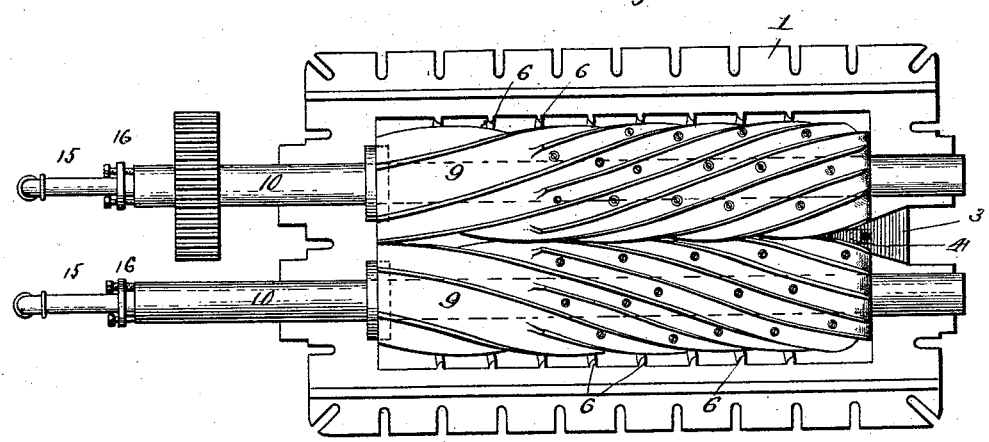
Figure 3:
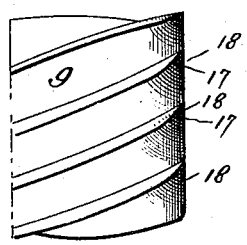
Figure 4:
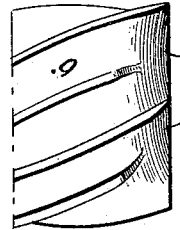
Figure 5:
Figure 6:

Figure 1 is a side elevation of my improved machine; Fig. 2, a plan view with the upper half of the casing removed; Fig. 3, a slightly enlarged plan view of the tail or exit end of one of the cylinders or rolls; Fig. 4, a similar view showing a slightly modified form of the spiral ribs and grooves; Fig. 5, an end view of the roll or cylinder shown in Fig. 3; Fig. 6, a similar view of the roll shown in Fig. 4; Fig. 7, a longitudinal section through one of the rolls or cylinders; Fig. 8, a similar view through one of the shafts of the rolls; Fig. 9, an end view of the machine, the upper part of the casing being removed; Fig. 9ª, an enlarged detail section through a part of one of the rolls, showing one of the adjustable steam outlets, and Fig. 10 a detail vertical section of the exit end of the casing, showing the steam inlet for the nozzle or exit-opening.

This invention relates to that class of triturating or grinding machines wherein the pulp stock is carried through the casing by means of a pair of rolls or cylinders provided with intermeshing spiral ribs, the pulp or fiber being subjected in its passage through the machine to a grinding or rubbing action between the adjacent ribs of the rolls, as more fully hereinafter described.

The objects of this invention are, essentially, to not only assist or facilitate the passage of the stock through the machine, but also to facilitate its discharge at the exit opening, as more fully hereinafter appears.

The preferred form of machine for carrying out my invention is shown in the accompanying drawings, in which—

The numeral 1 designates the casing, which is constructed of two horizontally divided sections, strongly bolted together, and has the form of a twin-cylinder in cross section; 2, the inlet hopper; 3, the exit opening at the opposite end, between the shafts of the rolls; 4, the usual knife fitted in a central longitudinal groove formed in the bottom of the interior of the casing, said knife being vertically adjusted by means of bolts or screws 5 tapped in the casing; and 6 spiral ribs formed on the interior of the casing.

Formed in the casing near its rear end is an inlet passage 7, whose inner end enters the casing just inside of the exit 3, at its lower edge the outer end of this passage being connected to a pipe 8, by means of which steam or other fluid may be forced into the passage 7. As shown most clearly in Fig. 10, the passage 7 opens directly under the rear end of the knife.

The two rolls 9 are fitted on the shafts 10, which extend longitudinally through the casing and are journaled in bearings formed between the sections of the same. The rolls are provided with spiral ribs, the ribs of the two rolls intermeshing at their adjacent sides and one roll being driven by the other, the driving roll having its power applied to it in any suitable manner. Each roll is in the form of a hollow cylinder fitted on its shaft, the interior of the cylinder being slightly enlarged the greater portion of its length to form an annular chamber 11 around the shaft. Formed in each roll are radial openings 12 which communicate with the chamber 11 and terminate between the ribs on the exterior of the roll, a series of these openings being formed in each groove of the roll. These openings 12 are preferably formed in screw plugs 13 tapped in suitable openings between the ribs, the openings 12 being set eccentrically in the plugs. The object of this is to permit the passages 12 to be adjusted rotatively in order that they may be made to open into the grooves on either side of the deepest portions thereof. In this way passages 12 may be set so that they shall not be liable to be plugged or stopped up by the stock as it is ground between the adjacent overlapping faces of the intermeshing ribs. Formed in each shaft is a passage 14 which communicates with the chamber 11 at its inner end and is connected to a steam pipe 15 at its outer end, said pipe being connected to the shaft by a suitable stuffing box 16.

The ribs on each roll have the same pitch throughout their length excepting at their extreme rear ends, at which point their pitch is slightly decreased by beveling their ends as at 17, and the grooves between the ribs also have their pitch decreased by being extended a short distance over upon the end of the roll, as at 18 in Figs. 3 and 5, the turned-over ends of the grooves being preferably tapered gradually into the end of the roll, as shown. Instead of thus carrying all the ribs to the end of the roll each alternate rib may be dropped off near the rear end, as shown in Figs. 4 and 6, the grooves on the opposite sides of the shortened ribs merging into each other and extending partly over upon the end of the roll as in Fig. 5.

The pulp-stock to be comminuted is introduced into the hopper and it is conveyed through the machine and ground by the spiral ribs on the rolls and is then forced out through the exit, the discharge being continuous. In working very tough and unyielding stock it frequently chocks or packs so tightly in the casing as to render necessary some means for softening and loosening the material. I accomplish this object by forcing steam into the interior of the rolls and out through the radial passages into the grooves between the ribs. This instantly softens and loosens the packed material and permits the rolls to grind it and force it out without danger of breaking the casing and without applying additional power to the rolls. Should the stock chock at the exit or nozzle it may be loosened by forcing steam or other fluid in through the pipe 8, as is obvious.

If desired pulp-liquid or some other lubricating compound may be introduced into passages 7 and 12 in conjunction with the steam or by itself, but it is thought that the steam alone if introduced under a sufficient pressure will be amply sufficient to lubricate the material through the machine.

The object of the peculiar formation at the rear ends of the rolls is to facilitate the discharge of the pulp through the exit, it having been found in practice that very tough stock will sometimes pack so closely at the rear end of the casing as to render the turning of the rolls a matter of great difficulty. The beveling of the ends of the ribs serves to more positively push the congested stock out through the exit opening as the ends of the adjacent interlocked ribs pass the same, as will be seen most clearly from Fig. 9. Enlarging the rear ends of the grooves and turning them over upon the ends of the cylinders or rolls permits the material to expand as it leaves the main portions of the grooves, thereby preventing undue chocking against the end of the casing. To assist the beveled ribs and the enlarged grooves in expelling congested stock, some of the passages 12 are made to open into the turned-over parts of the grooves, whereby steam or other fluid can be injected to soften and lubricate the stock. It has been found in practice that thus facilitating the exit of the material does not sufficiently decrease the necessary back-pressure or resistance to materially affect the character or quality of the work performed, while at the same time the capacity of the machine is materially increased.

This machine is especially adapted for grinding pulp-stock made from flax-straw, which is so difficult to work that none of the machines I am aware of are capable of efficiently grinding it, but of course it may be used with advantage in grinding other kinds of pulp and other materials.

Having thus fully described my invention, what I claim is—

1. In a machine for grinding pulp, the combination of a casing and a pair of spirally ribbed rolls therein, internal chambers being formed in the rolls and radial passages extending from said chambers and terminating in the grooves between the ribs on the rolls, as and for the purpose set forth.

2. In a machine for grinding pulp &c., the combination of a casing provided with an exit opening at its rear end, a pair of reducing rolls journaled therein and provided with intermeshing spiral ribs and intermediate grooves, said grooves being extended or turned over upon the ends of the rolls at the exit end of the casing, substantially as described.

3. In a machine for grinding pulp, the combination of a casing provided with an exit opening at its rear end, a pair of reducing rolls journaled therein and provided with intermeshing spiral ribs and intermediate grooves, the adjacent ends of said ribs being beveled off at the rear or exit end of the machine adjacent to the exit opening, substantially as described.

4. In a machine for grinding pulp, the combination of a casing provided with an exit opening at its rear end, a pair of reducing rolls journaled therein and provided with intermeshing spiral ribs and intermediate grooves, the rear ends of the ribs being beveled off and the rear ends of the grooves being enlarged adjacent to the exit opening, substantially as and for the purposes described.

5. In a machine for grinding pulp, the combination of a casing provided with an exit opening at its rear end, a pair of hollow ribbed reducing rolls journaled in the casing, the rear ends of the grooves formed by said ribs being carried over on the ends of the rolls, and fluid-passages extending from the interior of the rolls and terminating in the turned-over ends of the grooves, substantially as described.

6. A ribbed reducing roll, formed hollow and provided with threaded openings extending from the interior to the grooves between the ribs, and screw-plugs in said openings, these plugs being each provided with an opening extending to the interior of the roll and set eccentrically in the plug, substantially as described.

In testimony whereof I affix my signature in presence of two witnesses.

FRANCIS HICKMAN.

Witnesses:
 CHARLES D. DAVIS,
 J. TYLER RYAN.